United States Patent
Liu et al.

(10) Patent No.: US 10,558,558 B2
(45) Date of Patent: Feb. 11, 2020

(54) DYNAMIC ADJUSTMENT OF INSTRUMENT SCOPE

(71) Applicant: QUEST SOFTWARE INC., Aliso Viejo, CA (US)

(72) Inventors: ShengZhi Liu, GuangDong (CN); Yinghua Qin, GuangDong (CN); PeiSen Lin, GuangDong (CN)

(73) Assignee: QUEST SOFTWARE INC., Aliso Viejo, CA (US)

( * ) Notice: Subject to any disclaimer, the term of this patent is extended or adjusted under 35 U.S.C. 154(b) by 213 days.

(21) Appl. No.: 14/884,583

(22) Filed: Oct. 15, 2015

(65) Prior Publication Data
US 2017/0109268 A1    Apr. 20, 2017

(51) Int. Cl.
G06F 8/36    (2018.01)
G06F 11/36    (2006.01)
G06F 8/70    (2018.01)

(52) U.S. Cl.
CPC ............ *G06F 11/3688* (2013.01); *G06F 8/70* (2013.01)

(58) Field of Classification Search
CPC ............................. G06F 11/3688; G06F 8/70
USPC ......................................................... 717/130
See application file for complete search history.

(56) References Cited

U.S. PATENT DOCUMENTS

| | | | | |
|---|---|---|---|---|
| 2007/0074170 A1* | 3/2007 | Rossmann | .......... | G06F 11/3466 717/127 |
| 2011/0258617 A1* | 10/2011 | Park | .................... | G06F 11/3636 717/157 |
| 2012/0304172 A1* | 11/2012 | Greifeneder | ........ | G06F 9/45504 718/1 |
| 2013/0061215 A1* | 3/2013 | Sathyanathan | ....... | G06F 8/4435 717/157 |
| 2013/0227533 A1* | 8/2013 | Tonkin | ...................... | G06F 8/51 717/137 |
| 2015/0347263 A1* | 12/2015 | Chau | .................... | G06F 11/3409 717/130 |
| 2016/0085527 A1* | 3/2016 | de Lima Ottoni | .... | G06F 9/4426 717/157 |
| 2016/0104070 A1* | 4/2016 | Eslami | ..................... | G06N 5/04 706/12 |

* cited by examiner

Primary Examiner — Emerson C Puente
Assistant Examiner — Sen Thong Chen
(74) Attorney, Agent, or Firm — Maschoff Brennan

(57) ABSTRACT

Embodiments of the present invention include systems and methods for dynamically adjusting instrumentation scope of a profiler gent. The method for dynamically adjusting an instrumentation scope of a profiler agent includes: supplying an initial instrumentation scope profile (ISP) that defines an instrumentation scope of a profiler agent to the profiler agent; receiving performance data of a call tree from the profiler agent based on the initial ISP; adjusting the instrumentation scope; updating the initial ISP based on the adjusted instrumentation scope; and supplying the updated ISP to the profiler agent. Adjusting the instrumentation scope includes at least one of expanding a child node of the call tree and excluding a child node of the call tree from the instrumentation scope.

8 Claims, 5 Drawing Sheets

DYNAMIC ADJUSTMENT OF INSTRUMENT SCOPE

TECHNICAL FIELD

The present invention relates to adjustment of instrumentation scope, more particularly, to systems and methods for dynamically adjusting the scope of code instrumentation, which can be used, for example, to reduce the memory overhead for executing the instrumentation code.

DESCRIPTION OF THE RELATED ART

The term instrumentation refers to instruments for monitoring or measuring the level of software's performance and diagnosing errors. Typically, programmers implement instrumentation in the form of code instructions that monitor specific components in an application. Code instrumentation adds specific code automatically by a tool, which is referred to as instrumenter, to the application and reveals the performance information of a targeted portion of the application.

The code instrumentation uses various resources, such as memory, of the system where the instrumented application is running and increases the execution time of the instrumented application. Depending on the scope of code instrumentation, the overhead to the system resources may vary and the performance of the overall system may also change. In conventional systems, the scope of code instrumentation is specified in an instrumentation scope profile that is static and does not vary in time during operation of the system. As a consequence, the code instrumentation may impose unnecessary overhead on the system until the system is restarted again with an updated instrumentation scope profile.

Thus, there is a need for efficient systems and methods for dynamically adjusting the instrumentation scope during operation of the system so that the overhead brought by the instrumentation is appropriately sized without compromising the tracing capacity of the instrumentation and overlooking portions of the application to be instrumented.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may not be to scale.

DETAILED DESCRIPTION OF THE PREFERRED EMBODIMENTS

Figure 1:
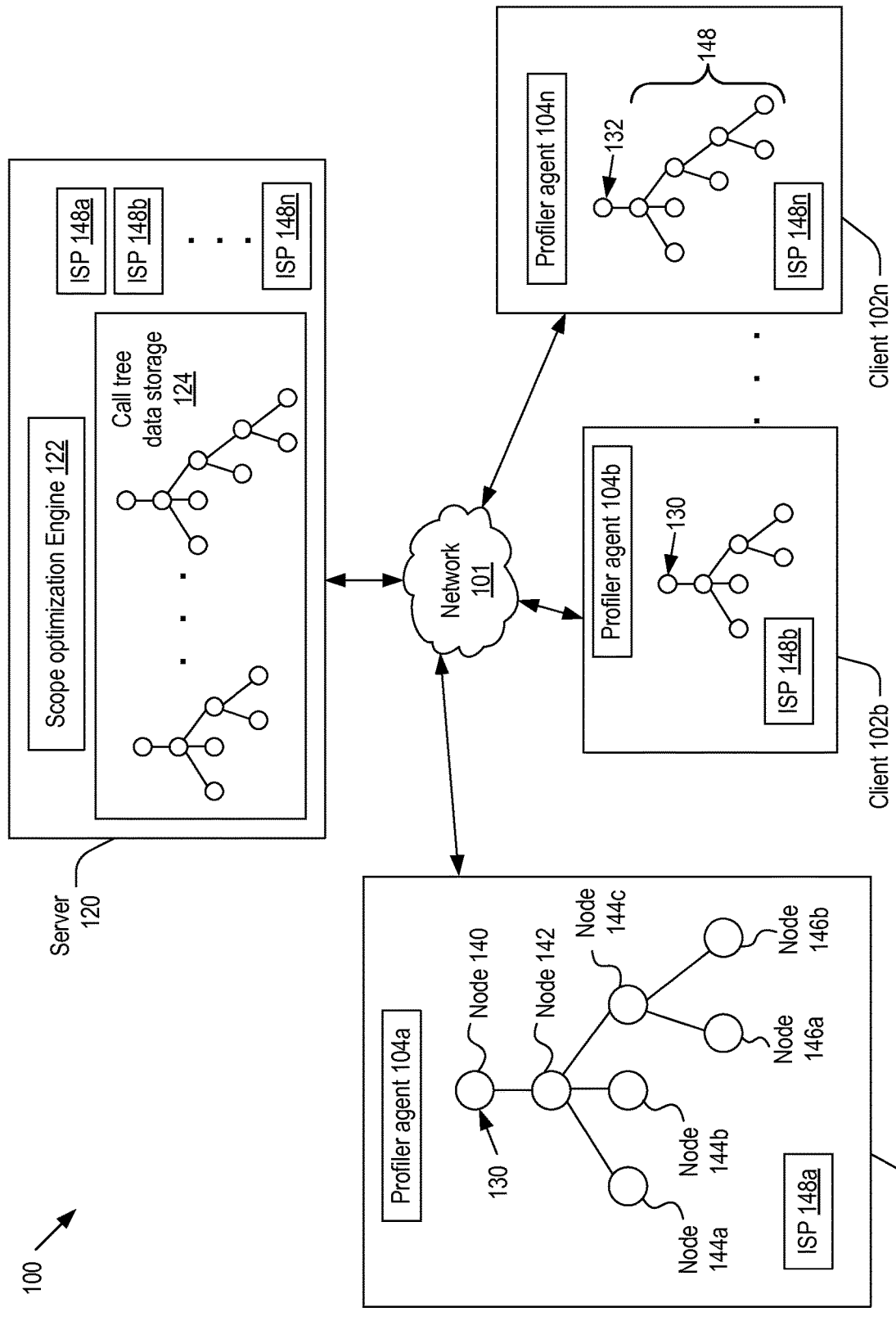
FIG. 1 shows a schematic diagram of an overall system according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components, nodes, or systems within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize that: (1) certain steps may optionally be performed; (2) steps may not be limited to the specific order set forth herein; and (3) certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. The terms "include," "including," "comprise," and "comprising" shall be understood to be open terms and any lists that follow are examples and not meant to be limited to the listed items. Any headings used herein are for organizational purposes only and shall not be used to limit the scope of the description or the claims.

Furthermore, the use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

FIG. 1 shows a schematic diagram of an overall system 100 according to embodiments of the present invention. As depicted in FIG. 1, clients 102a-102n are coupled to and communicate information to the server 120 via a network 101. Each client includes an electrical device for running one or more software applications thereon. For instance, the client 102a includes a graphic user interface (GUI) that allows the user to search information in an internet search engine.

When a client (e.g., 102a) receives a request, such as a search query, from a user, the application running on the client responds to the request by initiating a process according to a corresponding call tree 130. The call tree 130 represents calling relationships between methods (or subroutines) in the application and shows how one particular method calls other methods. In the depicted example, the call tree 130 has seven nodes 140-146, where each node represents a subroutine. For example, the root node 140 calls a method 142, and the method 142 calls three methods 144a-c (or, equivalently, three child nodes). And, in the depicted example, the method 144c calls two methods (child nodes) 146a and 146b. Hereinafter, the terms node, method, and subroutine are used interchangeably.

For the purpose of illustration, only two call trees 130 and 312 are shown in FIG. 1. However it should be apparent to those of ordinary skill in the art that each client may have multiple call trees for processing multiple requests and that any other suitable number and levels of nodes may be included in each call tree.

In embodiments, each client 102 includes a profiler agent 104 that controls code instrumentation of the client. The profiler agent 104 injects instrumentation code to a set of nodes in the call tree 130 (or 132) and collects the performance information of the set of nodes. (Hereinafter, the term "a set of" refers to one, a portion, or all of the objects that immediately follow the term.) In embodiments, an instrumentation scope profile (ISP) 148 included in each client specifies the instrumentation scope of the profiler agent 104, such as the set of nodes where the profiler agent 104 needs to inject the instrumentation code. The performance information collected by the profiler agent 104 is sent to the server 122 via the network 101 and stored in the call tree data 124.

In embodiments, using the call tree data 124, the scope optimization engine 122 that is included in the server 120 adjusts the instrumentation scope of each profiler agent 104. As discussed in conjunction with FIGS. 3 and 4, the scope optimization engine 122 determines which nodes can be excluded or included in the instrumentation scope. Based on the determination, the scope optimization engine 122 may dynamically update one or more of the ISPs 148 of one or more of the profiler agents 104 by sending the updated ISPs 148 to the corresponding clients 102. The profiler agents 104 controls the code instrumentation according to the updated ISP in the next instrumentation operation cycle (or, in short, cycle) so that the profiler agents 104 make use of the system resources of the clients 102 in an efficient manner in the next instrumentation operation cycle.

Figure 2:
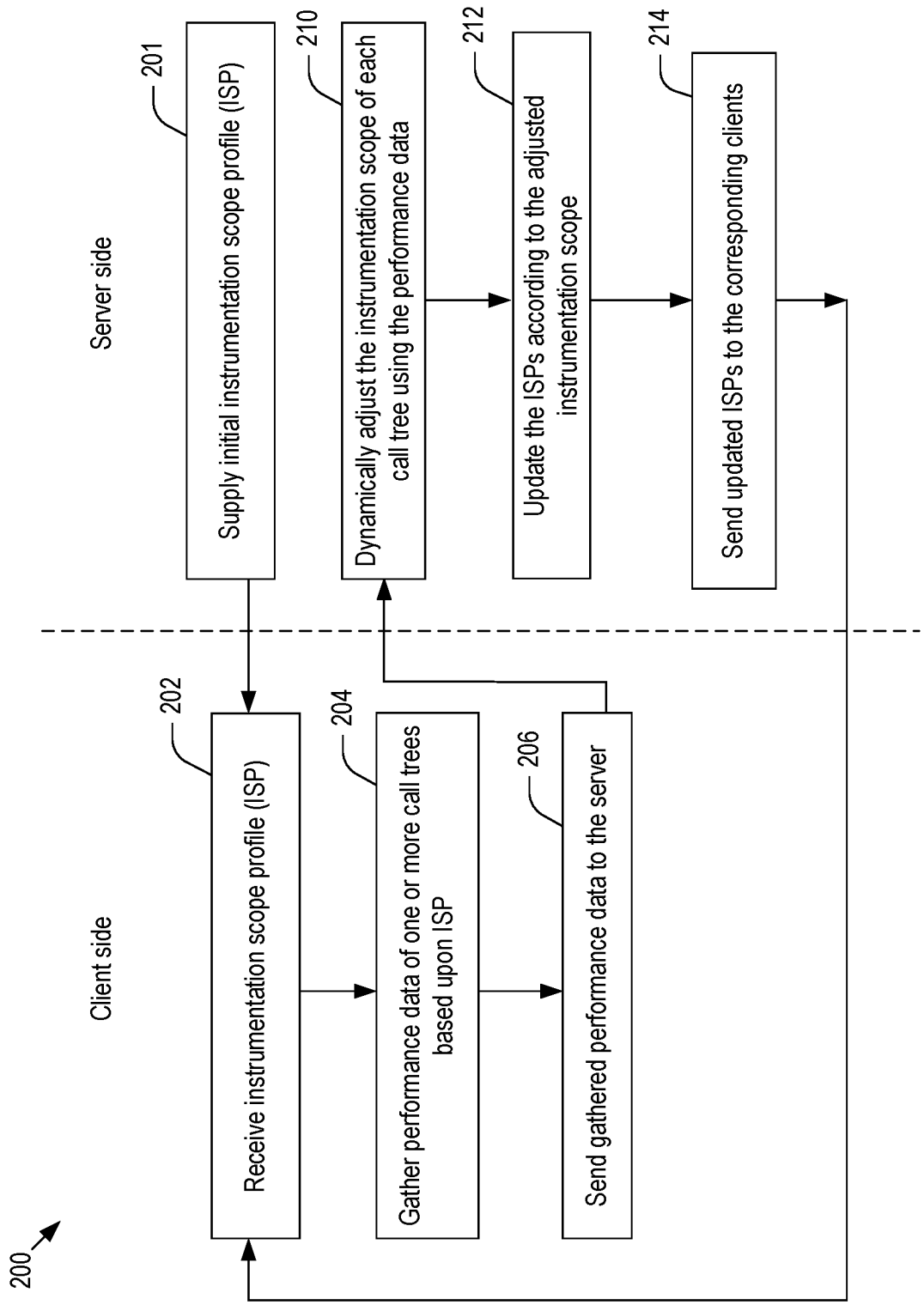
FIG. 2 shows a flowchart of an illustrative process for dynamically adjusting the scope of instrumentation according to embodiments of the present invention.

FIG. 2 shows a flowchart 200 of an illustrative process for dynamically adjusting the scope of instrumentation according to embodiments of the present invention. In embodiments, at step 201, the server 120 supplies an initial ISP to the client 102 at step 201, where the initial ISP specifies the initial instrumentation scope of the profiler agent. For example, the profiler agent 104a may control the code instrumentation of a JAVA® software program running on the client 102a. In such as case, the initial scope defined in the initial ISP may include all of the methods of classes (i.e., the instrumentation codes are injected into all of the methods of classes), but exclude some packages in Java Development Toolkit®software and third-party libraries. Then, at step 202, a client 102 receives the corresponding initial ISP.

At step 204, the profiler agent 104 gathers performance data of one or more call trees. In embodiments, the profiler agent 104 injects instrumentation codes to a set of nodes of each call tree as specified in the ISP and collects performance data, such as execution time for running the target node, using the injected codes. Then, the profiler agent 104 sends the gathered performance data to the server 120 at step 206.

At step 210, in embodiments, using the performance data, the scope optimization engine 122 dynamically adjusts the instrumentation scope of one or more the profiler agents. Embodiments of the dynamic adjustment are given below in conjunction with FIGS. 3 and 4. In embodiments, the server 120 may store the performance data and call tree information in the call tree data storage 124.

At step 212, in embodiments, the scope optimization engine 122 updates one or more of the ISPs 148 according to the adjusted instrumentation scope. In embodiments, the scope optimization engine 122 may expand the instrumentation scope by adding additional nodes into the list of nodes to be instrumented in the ISP, may narrow the instrumentation scope by excluding one or more nodes from the list, or a combination thereof. Then, at step 214, the updated ISPs 148 are sent to corresponding clients 102. In embodiments, the updated ISPs 148 may be periodically sent to the clients at a preset interval or may be sent only when the ISP is updated.

Upon receipt of the updated ISP, the profiler agent 104 adds or removes instrumentation codes from the methods according to the adjusted instrumentation scope. In embodiments, those pieces of instrumentation codes are the code instructions that could be added to the target monitor run-time environment through different technologies basing on different programing language, and the profiler agent 104 can add or remove the pieces of code from the methods by use of the modification and/or retransform technology. By way of example, it is assumed that the scope optimization engine 122 determines that the node 144c has performance issue and expands the scope by adding the child nodes 146a and 146b. In this case, the profiler agent 104 analyzes byte code or other equivalents basing on different programing language of the method corresponding to the node 144c, finds all of the instructions of calling other methods (i.e., 146a and 146b), and then adds instrumentation codes into the child nodes through retransform in java or other equivalent technologies basing on different programing language. In embodiments, to remove the transformation, the profiler agent can simply take another retransform in java or other equivalent technologies basing on different programing language.

In embodiments, the clients 102 and the server 120 may repeat the method of FIG. 2 to repeat instrumentation operation cycles. Unlike the existing approaches that use a static ISP, the instrumentation scope in the embodiments described in the current patent document may be dynamically adjusted at one or more instrumentation operation cycles according to the performance of clients, to thereby improve or adjust the usage of system resources by the instrumentation.

Figure 3:
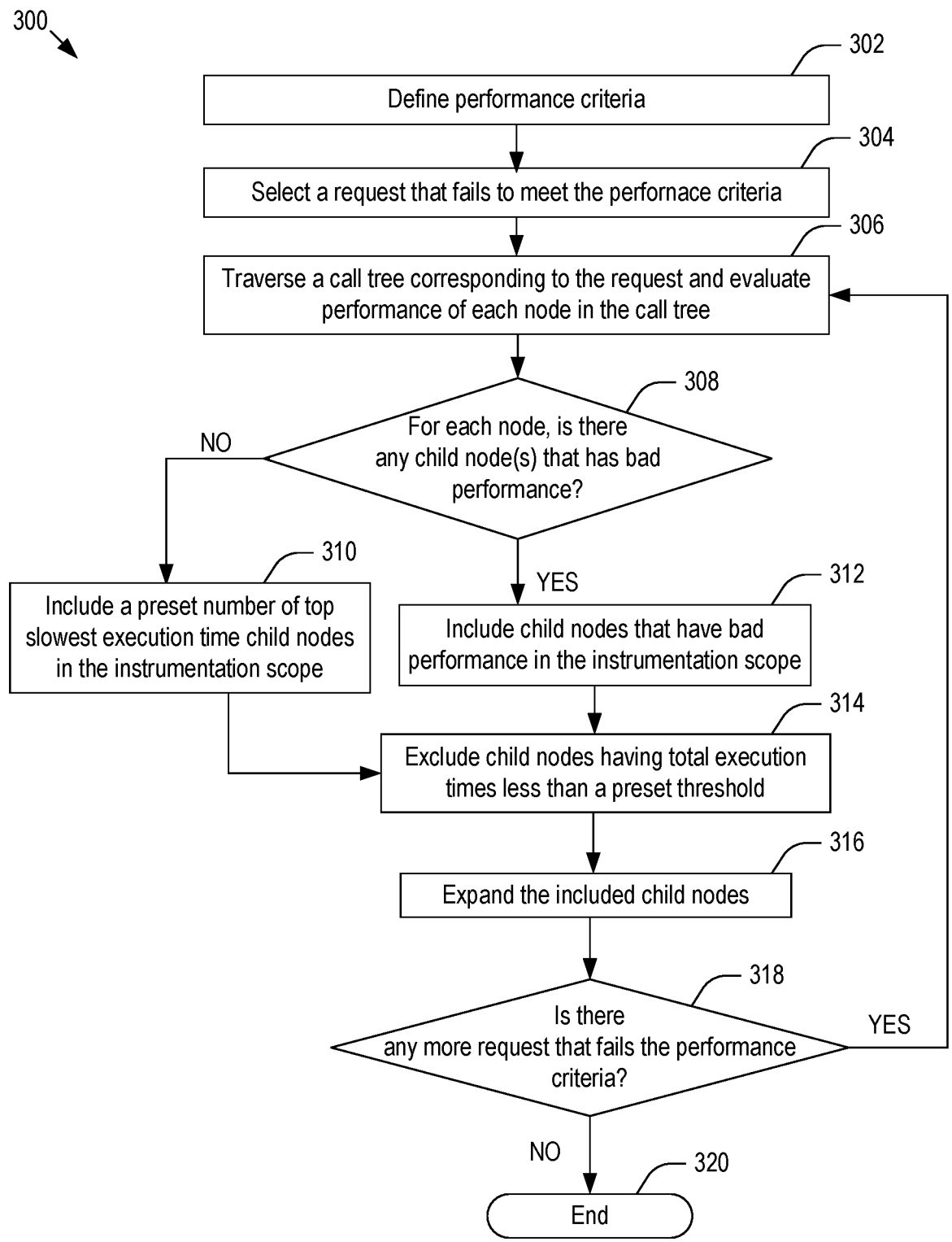
FIG. 3 shows a flowchart of an illustrative process for expanding nodes in a call tree according to embodiments of the present invention.

As discussed above, the server 120 may store the performance information of the call trees in the call tree data storage 124 and the scope optimization engine 122 may adjust the instrumentation scope of one or more of the profiler agents 104 using the historical performance information and a set of optimization rules. In embodiments, the scope optimization engine 122 adjusts the scope by expanding nodes that have performance issues, where the term "expand" refers to expanding the instrumentation scope to the child nodes in the call tree. FIG. 3 shows a flowchart 300 of an illustrative process for expanding nodes in a call tree according to embodiments of the present invention.

The process starts at step 302. At step 302, a set of criteria for evaluating the performance of each request (or, equivalently, call tree) is defined. In embodiments, a response time threshold (RTT) for each request is defined as a performance criterion. Then, at step 304, the scope optimization engine 122 selects one or more requests that fail to meet the performance criterion (or criteria). In embodiments, for each request, the percentile of actual response times that are greater than or equal to the RTT is determined using the historical performance data stored in the call tree data storage 124. If the percentile is greater than a preset value, the request fails the performance criteria and is considered to have performance issue.

In embodiments, at step 306, the scope optimization engine 122 traverses the call tree corresponding to a request having performance issue and evaluate the performance of each node in the call tree. In embodiments, the performance of each node (e.g. 144b) is evaluated based on the total execution time, where the total execution time is the product of the number of calls of the node 144b and the execution time for each call. If the total execution time of the node 144b is greater than a preset threshold, the node 144b is considered to have a performance issue. In embodiments, the preset threshold is a preset percentage of the total execution time of the caller (e.g. 142) of the node 144b.

At step 308, for each node (e.g. 142), it is determined whether there is any child node (e.g. 144c) that has performance issue in the call tree. If answer to step 308 is negative, at step 310, the scope optimization engine 122 includes a preset number of top slowest execution time child nodes in the instrumentation scope. Then, the process proceeds to step 314. Otherwise, the scope optimization engine 122 includes the child node(s) (e.g. 146a and 146b) that has bad performance in the instrumentation scope at step 312.

At step 314, the scope optimization engine 122 excludes a node(s) having minor total execution time from the instrumentation scope. In embodiment, the total execution time, which is the product of the number of calls and execution time for each call, is considered minor if it is less than a preset threshold. At step 316, the scope optimization engine 122 expands the instrumentation scope by adding the child nodes included in the instrumentation scope. For instance, node 144c is included in the instrumentation scope at step 312 if the method corresponding to the node 144c has bad performance. In such a case, the instrumentation scope is expanded to include the child nodes 146a and 146b so that the profiler agent 104a injects instrumentation codes into the child nodes 146a and 146b in the next instrumentation operation cycle.

In embodiments, steps 312-316 are repeated until there is no child node to be expanded or the child node is a tree leaf node. In embodiments, the leaf node includes classes in a pre-defined list of packages that does not need to be instrumented, such as java.lang and java.util computer software.

In embodiments, at step 318, the scope optimization engine 122 determines whether there is any request that fails the performance criteria and is yet to be traversed. If the answer to step 318 is positive, the process proceeds to step 306 so that the steps 306-318 are repeated. Otherwise, the process stops at step 320.

Figure 4:
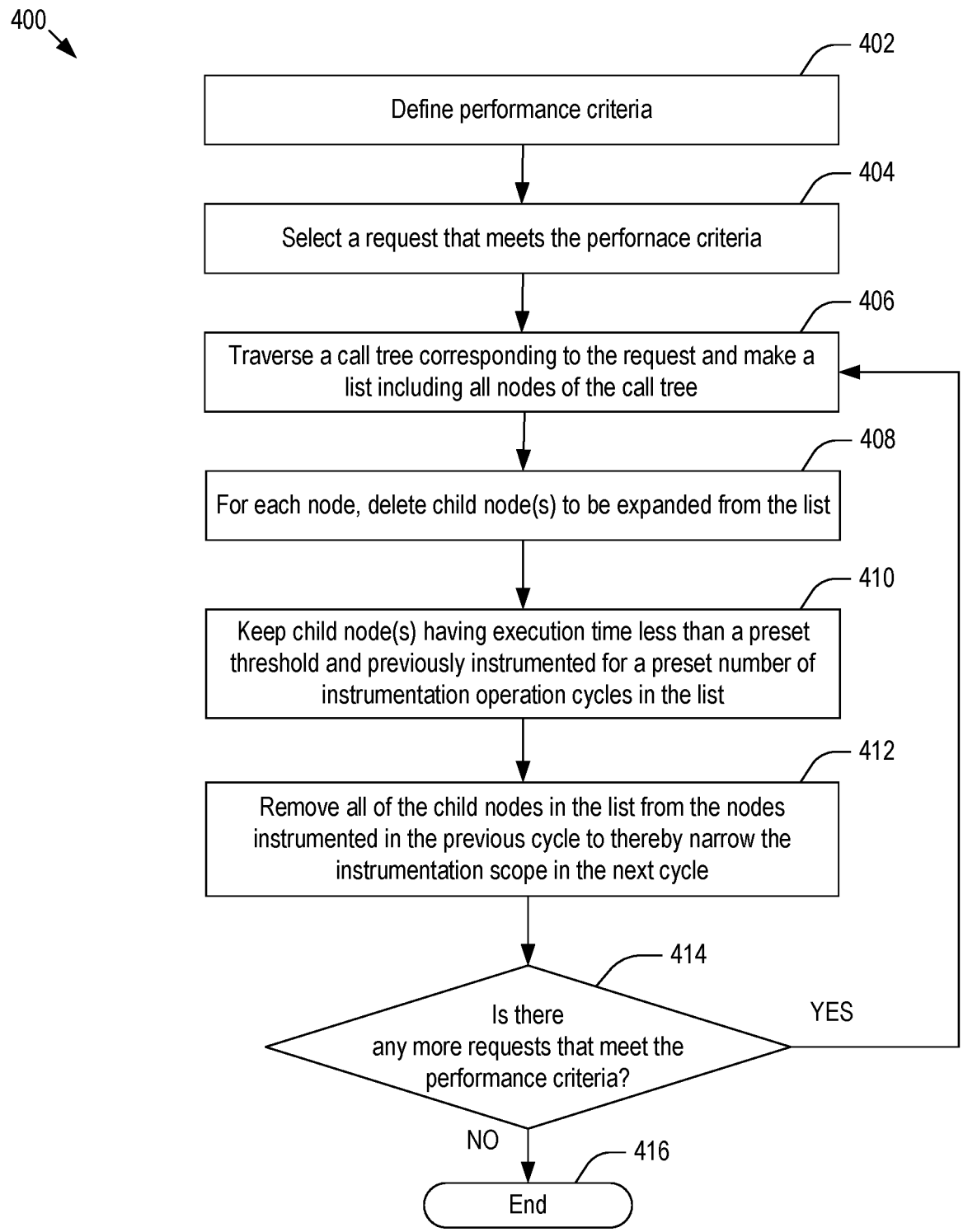
FIG. 4 shows a flowchart of an illustrative process for dynamically excluding nodes in a call tree according to embodiments of the present invention.

In embodiments, the scope optimization engine 122 adjusts the scope by excluding nodes that have good performance from the list of nodes that were instrumented in the previous instrumentation operation cycle. FIG. 4 shows a flowchart 400 of an illustrative process for dynamically excluding nodes in a call tree according to embodiments of the present invention. The process starts at step 402. At step 402, a set of criteria for evaluating the performance of each request is defined. In embodiments, a response time threshold (RTT) for each request is defined as a performance criterion. Then, at step 404, the scope optimization engine 122 selects one or more requests that meet the performance criteria. In embodiments, for each request, the percentile of actual response times that are smaller than the RTT is determined using the historical performance data stored in the call tree data storage 124. In embodiments, if the percentile is smaller than a preset value, the request is considered to have good performance.

At step 406, the scope optimization engine 122 traverses the call tree corresponding to a request having good performance and prepares a list including all child nodes in the call tree. For instance, assuming that the call tree 132 corresponds to a request having good performance, the list includes nodes 148 of the call tree 132. Then, for each node, the instrumentation optimization engine 122 performs the three steps 408, 410 and 412. At step 408, the child nodes to be expanded in step 316 are deleted from the list.

In embodiments, at step 410, the scope optimization engine 122 determines whether the child node(s) meets the two conditions; (1) the child node is instrumented for a preset number of cycles and (2) its total execution time is less than a preset threshold. The first condition is enforced to ensure that the number of data samples is large enough in the statistics perspective. The child node(s) that satisfies the two conditions are kept in the list.

In embodiments, at step 412, the child node(s) in the list is removed from the nodes that were instrumented in the previous instrumentation operation cycle so that the instrumentation scope is narrowed in the next cycle. At step 414, it is determined whether there are any more requests that meet the performance criteria. If the answer to step 414 is positive, the process proceeds to step 406 and repeats steps 406-414. Otherwise, the process stops at step 416.

The scope optimization engine 122 adjusts the instrumentation scope in the next cycle by expanding child nodes that have performance issue at step 316 or excluding child nodes that have good performance at step 412. Then, as discussed above, the instrumentation optimization engine 122 updates the ISP based on the adjusted instrumentation scope at step 212 and sends the updated ISP to the corresponding client 102 so that the ISP is dynamically updated.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 5:
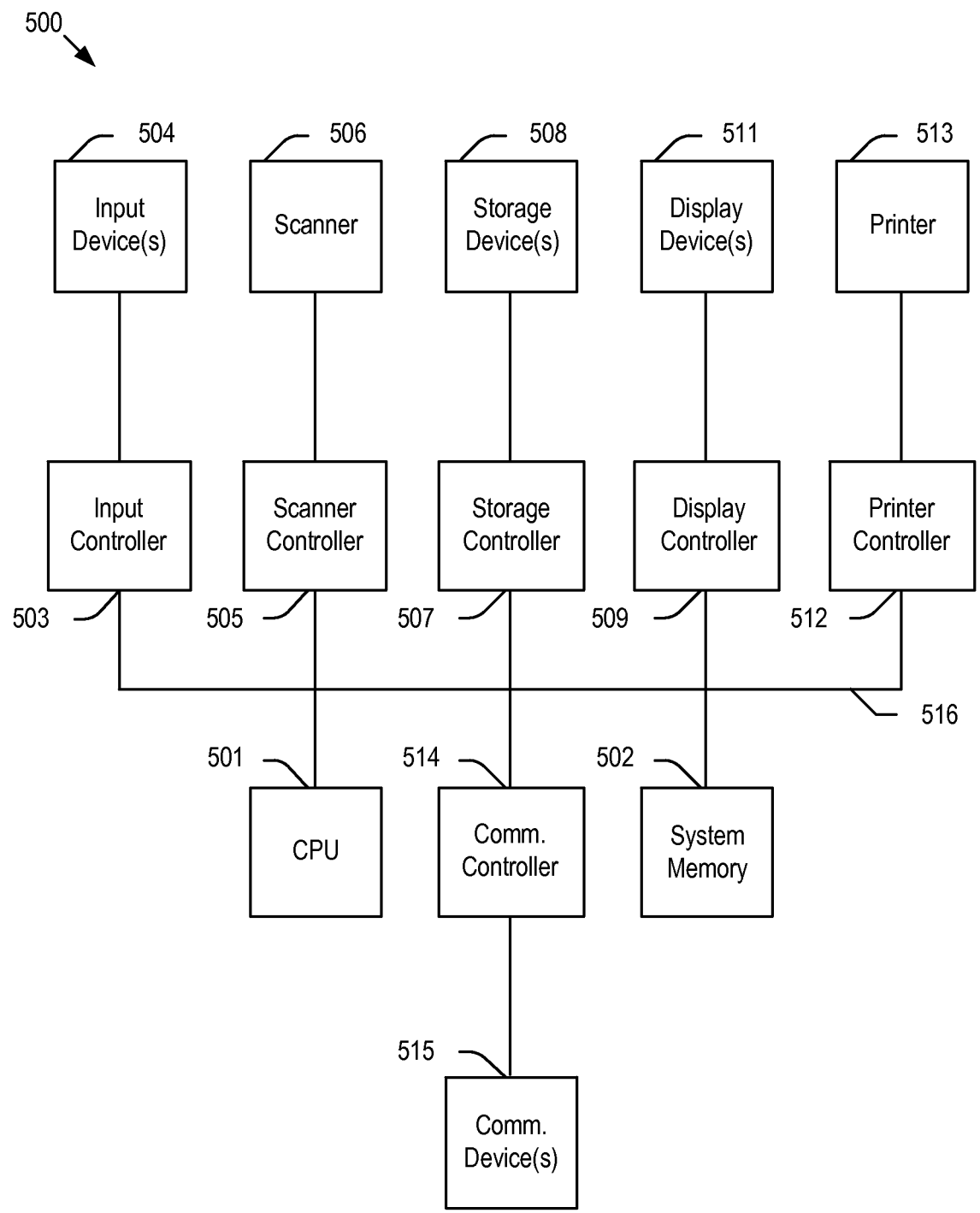
FIG. 5 shows a computer system according to embodiments of the present invention.

Having described the details of the invention, an exemplary system 500, which may be used to implement one or more aspects of the present invention, will now be described with reference to FIG. 5. Each client/server in FIG. 1 includes one or more components in the system 500. As illustrated in FIG. 5, system 500 includes a central processing unit (CPU) 501 that provides computing resources and controls the computer. CPU 501 may be implemented with a microprocessor or the like, and may also include a graphics processor and/or a floating point coprocessor for mathematical computations. System 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. System 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. Storage device(s) 508 may also be used to store processed data or data to be processed in accordance with the invention. System 500 may also include a display controller 509 for providing an interface to a display device 511, which may be a cathode ray tube (CRT), a thin film transistor (TFT) display, or other type of display. System 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method to dynamically adjust an instrumentation scope of a profiler agent, the method comprising:
   supplying an instrumentation scope profile (ISP) that defines an instrumentation scope of a profiler agent to the profiler agent;
   receiving performance data of a node of a call tree from the profiler agent based on the ISP;
   determining, based on the performance data, that the node has a performance issue;
   adjusting the instrumentation scope based on the performance issue by excluding, from the instrumentation scope, a child node having a total execution time less than a preset threshold and previously instrumented during a preset number of instrumentation operation cycles;

updating the ISP based on the adjusted instrumentation scope, wherein the updated ISP includes an instruction for the profile agent to inject instrumentation code to at least one node of the call tree through a transformation of the instrumentation code to a different programming language; and supplying the updated ISP to the profiler agent.

2. A method as recited in claim 1, further comprising adjusting the instrumentation scope, for a node in the call tree, by expanding the instrumentation scope.

3. A system to dynamically adjust an instrumentation scope of a profiler agent, comprising:

one or more processors; and a non-transitory computer-readable medium or media comprising one or more instructions which, when executed by the one or more processors, causes the system to perform operations comprising:

provide an instrumentation scope profile (ISP) that defines an instrumentation scope of a profiler agent to the profiler agent;

receive performance data of a node of a call tree from the profiler agent based on the ISP;

determine, based on the performance data, that the node has a performance issue;

adjusting the instrumentation scope based on the performance issue excluding, from the instrumentation scope, a child node having a total execution time less than a preset threshold and previously instrumented during a preset number of instrumentation operation cycles;

update the ISP based on the adjusted instrumentation scope, wherein the updated ISP includes an instruction for the profile agent to inject instrumentation code to at least one node of the call tree through a transformation of the instrumentation code to a different programming language; and provide the updated ISP to the profiler agent.

4. A system as recited in claim 3, further comprising adjusting the instrumentation scope, for a node in the call tree, by expanding the instrumentation scope.

5. A profiler agent to dynamically adjust an instrumentation scope comprising:

a memory; and one or more processors operatively coupled to the memory, the one or more processor being configured to execute instructions to cause the profiler agent to perform operations comprising:

receiving an instrumentation scope profile (ISP) that defines an instrumentation scope of the profiler agent from a controller;

gathering performance data of a node of a call tree based on the ISP, wherein the performance data is indicative that the node has a performance issue;

submitting the gathered performance data to the controller;

receiving an updated ISP from the controller, wherein the updated ISP excludes a child node having a total execution time less than a preset threshold and previously instrumented during a preset number of instrumentation operation cycles; and inject instrumentation code to at least one node of the call tree through a transformation of the instrumentation code to a different programming language.

6. A profiler agent as recited in claim 5, the further comprising:

gathering new performance data based on the updated ISP; and submitting the new performance data to the controller.

7. A profiler agent as recited in claim 5, wherein the updated ISP has one or more excluded nodes relative to the ISP.

8. A profiler agent as recited in claim 5, wherein the updated ISP has one or more included nodes relative to the ISP.

* * * * *